United States Patent Office 3,275,631
Patented Sept. 27, 1966

3,275,631
PROCESS FOR THE PRODUCTION OF
CYANURIC ACID
Hiroshi Yanagizawa, Marugame-shi, Japan, assignor to Shikoku Kasei Kogyo Company Limited, Marugame-shi, Kagawa-ken, Japan
No Drawing. Filed Aug. 5, 1964, Ser. No. 387,770
Claims priority, application Japan, Sept. 27, 1963, 38/51,571
7 Claims. (Cl. 260—248)

This invention is for improvements in or relating to the production of cyanuric acid. More particularly, this invention relates to a process of producing cyanuric acid by heating urea or biuret or a mixture thereof.

It has been well known that cyanuric acid is obtained by heating urea or biuret or a mixture thereof up to a temperature higher than the melting points thereof, the reaction being in accordance with the reaction formulas:

or

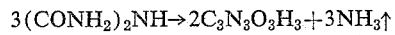

However, it has been the practice that various secondary reactions are accompanied other than those represented by the above formulas. Particularly, in case where the heating temperature is uneven, many secondary reactions occur with a result of a low yield of cyanuric acid produced. Further, during the conversion of urea or biuret to cyanuric acid by heat treatment, the physical state of the reactant changes successively from liquid to solid through a white turbid viscous state. Namely, when urea or biuret is heated, at first a clear liquid is obtained having a relatively low viscosity at the melting point thereof. Then by heating further up to a temperature of from 150° C. to 180° C., evolution of gaseous $NH_3$ is begun while the liquid becomes more viscous. At a temperature of 200° C. to 220° C. gaseous $NH_3$ is evolved energetically, obtaining an extremely viscous white semi-solid which is solidified finally. When the solid is heated further up to a temperature of from 250° C. to 300° C., the major part of the reactant is converted to cyanuric acid. By still heating continuously, when temperature of the reactant becomes 300° C. or higher, the cyanuric acid once produced decomposes gradually into gaseous cyanic acid resulting in emission thereof. By virtue of the change in the state of the reactant being heated as above, during operation in accordance with the prior art of producing cyanuric acid by heat treatment of urea or biuret or a mixture thereof in a conventional heating equipment, the product adheres to the wall of the equipment, impellers and the like so that the operation becomes remarkably difficult and, in addition, it becomes difficult to heat so as to bring an even temperature. Thus the yield of cyanuric acid is lowered.

In order to avoid the drawbacks as above, many methods have been proposed heretofore. However, various disadvantageous effects due to the adhesion of the product onto the heating surface and the like as above have not yet been evaded. Otherwise, complicated equipments and/or complex operations have been required so that it is deemed that those propositions are economically unsatisfactory in the commercial point of view. In view of this, this invention has been achieved upon many various physical and chemical experiments with respect to the starting materials and products in order to improve the prior art.

The principal object of this invention is to provide a process by which cyanuric acid having a high purity may be produced with an excellent yield employing simple equipments and a little labour. It is believed that such characteristics as above would be very advantageous as a commercial process of producing cyanuric acid. Further objects will appear from the following description.

In accordance with this invention, urea or biuret or a mixture thereof is heated on the upper surface of a metal maintained in the molten state. As set forth hereinbefore, such a series of changes in the physical state as from liquid to solid through a viscous state is accompanied by the formation reaction of cyanuric acid from urea or biuret. Therefore, it is difficult to avoid the adhesion of the reactant on a heating surface as far as they are operated directly on a solid heating surface. However, if a third substance which is always kept in the liquid state is interposed between the reactant and the solid heating surface during the changing period of the reactant, the adhesion of the reactant onto the solid surface as above would naturally be avoided. Considering as above, it has been found that it is quite pertinent to use metals or alloys maintained in the molten state as the above third substance. This idea is derived from the fact that metals and alloys have in general good thermal conductivities so that they are superior to any other substance as a heating medium and they have far larger specific gravities than the reactant has and, in addition, considerably large surface tensions so that the reactant is in a perfectly floating state on the surface of a metal bath during the heat treatment whereby they are prevented from mixing with each other and the resultant product may be separated from the metal extremely easily without any accompaniment of the metal of the heating bath after the reaction has been completed. In addition, by virtue of the fact that the heat treatment is carried into effect on the surface of the molten metal, which is the perfect level, the molten and fed materials are distributed evenly so as to have an even thickness during heating. Accordingly, the resultant solid intermediate product becomes a plate having an even thickness. Therefore, there is such an advantage that the intermediate product may be heated further up to a comparatively even temperature.

In the process of producing cyanuric acid from urea in accordance with the prior art, such a process that the material is heated while suspended and dispersed in various organic solvents which are chemically inactive and have boiling points in the proximity of or higher than the formation temperature of cyanuric acid has been known. Although also the process has the advantage that the product does not adhere onto the solid surface of the heating tank and the like and it is possible to carry the reaction into effect at an even temperature, the organic solvent employed is adsorbed to the saturated state in the particles of cyanuric acid produced because of the fact that there are far smaller difference in specific gravity and boundary tension between the employed solvent and the reactant than those between the molten metal and the reactant in the process in accordance with this invention. It is impossible to separate and recover the adsorbate completely by such a simple procedure as a merefiltration and the like, but such a troublesome post-treatment as vacuum distillation, steam distillation and the like is required for the purpose. In addition, there is such a drawback that rather expensive organic solvents are unavoidably lost to a certain appreciable extent.

In accordance with this invention, any metal may be useful in the process conditional on that it is comparatively inactive to urea and the heat treatment products thereof and kept in the liquid state in the temperature range which is pertinent for the conversion of urea into cyanuric acid. There are many metals conditioned as above. However, the preferred metals include simple substances of such elements as tin, bismuth, lead, and the like, and alloys, for instance, those consisting of tin, antimony and lead, of bismuth, cadmium, lead and tin, of lead and tin, and the like. By virtue of the fact that the surface of the molten metals as above is always covered by a thin compact film of oxide thereof, the reactant is insulated from the metal by the film of the oxide so that there is substantially no occurrence of an attack on the metal due to a reaction therebetween and the reactant in case where urea, biuret, or a mixture thereof is subjected to a heat treatment.

The process in accordance with this invention is started by maintaining a metal selected out of those set forth just hereinbefore in the liquid state at a constant temperature ranging from 200° C. to 400° C. and supplying a starting material consisting of urea, biuret, or a mixture thereof onto the molten metal. If the temperature of the metal bath is lower than a temperature of 200° C., the reaction velocity becomes extremely low. Meantime, if the temperature is higher than a temperature of 400° C., the decomposition of once produced cyanuric acid becomes remarkable. Therefore, these two extreme ranges of temperature are not preferred. Within a period of from 2 to 10 minutes, the material charged is solidified into a plate through the change in physical state set forth hereinbefore. By continuing the heat treatment of the reactant for a period of from 2 to 30 minutes as it is after the solidification, the composition of the reactant becomes about 70 percent of cyanuric acid, 25 percent of ammeline and ammelide and 5 percent of biuret. The resultant composition is removed from the metal bath, ground, and then subjected to hydrolysis by heating in an aqueous solution of a mineral acid having a concentration of from 5 to 30 percent, yielding cyanuric acid having a purity above 99 percent.

The above description is referred to a case in which the heat treatment operation is carried into effect entirely on the surface of a molten metal until the major part of urea and/or biuret is converted into cyanuric acid, ammeline, and ammelide. It is economically preferable, however, from the commercial point of view, that the output in proportion to the quantity of metal used is increased by supplying the starting material as much as possible per unit area of the surface of the molten metal. In such a case the solid plate formed on the molten metal duly becomes thicker so that the heat transfer towards the upper part of the solid plate opposite with the molten metal becomes insufficient, resulting in to lower the rate of thermo-cracking. Although as a counter-move to the above it may be possible to take such a measure as to increase the rate of thermo-cracking in the upper part by means of applying heat radiated downwards to the upper part, the following procedure is preferred. That is, during the state of urea or biuret fed is changed from liquid to solid through a viscous state, the heat treatment is carried into effect only on the surface of the molten metal and, when the reactant has been solidified, the resultant solid is separated from the metal bath and ground into powder or granule having free fluidity. The powder or granule thus fluidized is then heated up to a temperature of 230° C. to 300° C. for 10 to 60 minutes in a jacketed stirring heating tank so as to complete the reaction. The composition of the intermediate product just solidified on the molten metal is about 61 percent of cyanuric acid, 12 percent of ammeline and ammelide, and 27 percent of biuret. The intermediate product does neither melt nor soften by further heating so that such a phenomenon as adhesion of the intermediate product onto the wall of the tank or the stirrer does not occur even a conventional heating tank for powder is used for heating the powder or granule fluidized as above. Such being the case, it is possible to effect the heat treatment in such a manner that, after the solidified plate-shaped intermediate product has been separated from the molten metal and then ground into fluid powder or granule, all parts of a mass of the powder or granule are heated up to an even temperature while stirred and displaced suitably as above. The powdery or granular substance thus subjected to the heat treatment at a temperature of 230° C. to 300° C. for 10 to 60 minutes contains 70 to 75 percent of cyanuric acid and 25 to 30 percent of ammeline and ammelide. The substance is purified by heating in an aqueous solution of a mineral acid having a concentration of 5 to 30 percent, yielding cyanuric acid having a purity above 99 percent as set forth hereinbefore.

In case where the material, urea or biuret, is converted into cyanuric acid by heating the material in accordance with the process as above, a quantity of urea corresponding to 10 to 30 percent of the material fed is sublimated, being accompanied with gaseous $NH_3$ generated during the heat treatment operation. Therefore, for the commercial production of cyanuric acid, it is preferred to recover the urea sublimated as above by leading the gas evolved during the heat treatment operation to a urea recovering means through a gas exhausting pipe. In order to recover the urea, the following methods and the like may be utilized. In a method the gas generated is led to water or a urea solution so as to dissolve the sublimated urea. In another method, the gas is washed with molten urea. In still another method, the gas is led to a condensation surface kept at a temperature of 100° C. to 130° C. so as to condense the sublimated urea contained in the gas.

In accordance with this invention, as stated hereinbefore, it is possible to convert urea, biuret, or a mixture thereof into cyanuric acid having a high purity with a yield of 80 to 90 percent. The following examples illustrate methods of carrying the invention into effect; however, this description will be understood to be illustrative of the invention and not as limiting it to the particular methods described.

*Example 1*

An iron box tank of 1 m.² in bottom area and 10 cm. in depth was supplied with molten tin of 5 cm. in thickness which was heated up to a temperature of 280° C. by an electric heating means applied to the bottom. A temperature controller dipped into the molten tin was electrically connected with the heating means so as to deenergize the latter automatically when the temperature of the molten tin became up to 280° C., resulting in maintaining the temperature of the molten metal within the range of from 270° C. to 280° C. during the operation of this example. 20 kg. of powdery urea was charged slowly on the surface of the tin bath maintained in the above state, which was soon molten and distributed evenly on the surface of the tin bath. The resultant molten urea became about 1.5 cm. thick on that surface and heated so as to make the urea viscous gradually while evolving gaseous ammonia. About 3 minutes after from the supply of the urea, a substantially dry plate-like solid was yielded. After the evolution of gaseous ammonia had been ceased by maintaining in that state for further 3 minutes, the plate-like intermediate product floating on the surface of the tin bath was taken up. During the treatment, gas generated from the tin bath was introduced into a 70 percent aqueous solution of urea kept at a temperature of from 70° C. to 80° C. so as to recover urea sublimated by the heat treatment. Thus 11.5 kg. of the heat treatment product was obtained, which contained 71 percent of cyanuric acid, 19.65 percent of ammelide, and 9.35 percent of biuret, other than 0.05 percent of inorganic ash, whereby it was found that tin adhered to the intermediate product was extremely slight. The intermediate product was then heated in 10 percent aqueous solution of sulphuric acid for 3 hours, filtered, washed with water, and dried, yielding 10.3 kg. of 99.5 percent cyanuric acid. The yield corresponds to 72 percent of the theoretical yield obtainable from a supply of 20 kg. of urea. The aqueous urea solution into which the gas generated during the heat treatment had been introduced was analyzed and it is found 4 kg. of urea was contained therein. Accordingly, the yield of cyanuric acid becomes 90 percent by deducting the recovered urea from the supplied urea.

*Example 2*

A heating tank similar to that used in the preceding example was supplied with a molten alloy comprising 60 parts of tin and 40 parts of lead and kept at a similar temperature to that example. Meantime, 20 kg. of urea had been heated up to a temperature of 180° C. for 10 minutes in another heating receptacle, obtaining a white cloudy liquid, the main component being biuret. The white cloudy liquid was led gradually onto the surface of the molten alloy bath, distributed thereon evenly with a thickness of about 1.5 cm., and heated for about 2 minutes from the start of the supply of the liquid, obtaining almost dry plate-like solid. Subsequently, the solid was treated similarly to in the preceding example. Gaseous product generated during the heating in the other receptacle for converting urea to biuret was added together so the gas generated during heating on the alloy bath and led into a 70 percent aqueous solution of urea kept at a temperature of from 70° C. to 80° C. so as to recover sublimated urea. The yield of the heat treatment product was 12 kg. containing 75 percent of cyanuric acid, 20 percent of ammelide, and 5 percent of biuret as well as 0.03 percent of inorganic ash. The intermediate product was ground down to 40 mesh, heated in a 10 percent aqueous solution of hydrochloric acid for 3 hours, filtered, washed with water, and dried, yielding 11.4 kg. of 99.5 percent cyanuric acid, which corresponds to 79.5 percent of the theoretical yield obtainable from 20 kg. of the starting urea. The aqueous urea solution into which the gas generated during the heat treatment had been introduced was analyzed, finding that 3.5 kg. of urea had been added. Accordingly, the yield of cyanuric acid attains 94 percent by deducting the recovered urea from the supplied urea.

*Example 3*

In this example the method in accordance with this invention was operated continuously.

A heating bath filled with molten tin similarly to in the Example 1 was used. Two lines of stainless steel wire rope were arranged in such a manner that they were contacting with the surface of the molten tin, and in parallel with each other at an interval of 1 m. They were an endless ones and adapted to be run always in a constant direction at a constant velocity while contacting lightly with the bath. At the starting end of the heating bath, molten urea heated up to a temperature of 140° C. was charged on the surface of the molten tin between the two lines of wire ropes at a constant rate of 100 kg. per hour. Molten urea thus charged spread with an even thickness of about 15 mm. on the tin bath and arrived laterally at the two lines of the wire ropes displacing towards the other end of the bath at the constant velocity so that the molten urea was displaced gradually to the other end of the bath together with the wire ropes. During the displacement, the molten urea became a solid plate through a viscous state by virtue of the heat treatment by the tin bath. The intermediate product in the form of the solid plate arrived at the other end of the bath was drawn up therefrom together with the two lines of wire ropes, as the solid plate contacted with the wire ropes, and delivered continuously to a grinder arranged in the next place. For the above treatment, the reactant was stayed on the tin bath for 3 minutes. The intermediate product ground down to not exceeding 40 mesh was sent to a secondary heater by means of a screw feeder.

For the secondary heating, a stainless steel ribbon mixer having a diameter of 0.3 m. and a length of about 2 m. and provided with a heating jacket through which a heating medium heated up to a temperature of 300° C. was recirculated, was employed. The intermediate product supplied in the starting end of this secondary heater was gradually displaced towards the other end while being stirred by means of stirring blades. During this displacement, temperature of the reactant was maintained at 280° C. The passage of the reactant through the secondary heater required about 30 minutes on an average. The product obtained from the secondary heater was composed of 80 percent of cyanuric acid, 17 percent of ammelide and 3 percent of biuret and weighed 64.5 kg. per hour. The whole quantity of gas generated during the heat treatment on the tin bath and in the secondary heater was led to a urea condensing means arranged above the heating tin bath. The urea condensing means is composed of a plurality of aerofin tubes through which a heating medium heated up to a temperature of about 120° C. was recirculated so that urea contained in the gas was liquefied, impinging on the aero-fins, and thus recovered onto the tin bath arranged below. On arrival of the product at the other end of the secondary heater, it was fed continuously to a hydrolysis tank together with a 15 percent aqueous solution of sulphuric acid. The hydrolysis tank having a capacity of 2 m.$^3$ is lined with glass and provided with a heating jacket, a stirrer, an inlet for the heat treatment product, an inlet for the 15 percent sulphuric acid, and an overflow pipe for bringing the hydrolyzed product out of the tank. The heat treatment product supplied into the hydrolysis tank was stayed in the 15 percent aqueous solution of sulphuric acid kept at the boiling temperature for 4 hours on an average, subsequently led to a cooling tank through the overflow pipe continuously and cooled down there to a temperature of 20° C. The cooled product was centrifuged from the sulphuric acid solution, washed with water, and dried, yielding 99.5 percent cyanuric acid.

A 24-hour continuous operation was effected in this example. A total quantity of 2.4 tons of urea was charged for the period, yielding a total quantity of 1.5 tons of cyanuric acid. Thus the yield was 88.2 percent. Meantime, 1 kg. of tin was consumed for the period. Accordingly, the rate of consumption of tin was merely 0.067 percent of the cyanuric acid obtained.

*Example 4*

A heating bath similar to that of the last example was used, in which a molten alloy composed of 60 parts of tin, 30 parts of lead, 10 parts of antimony was filled. A gas washing column or urea recovering column packed with Raschig's rings was provided above the heat treatment means of the molten alloy bath for recovering urea once sublimated. The molten urea heated up to a temperature of 130° C. was shedded from the top of the column and the gas generated in the heat treatment means was led to the bottom of the column, making it flow in the manner of the counter current to the molten urea shedded, so as to absorb thereby the urea sublimated and carried by the gas. The output of the molten urea flowed down to the bottom of the column was partly fed continuously onto the alloy heating bath and the balance was led to the top of the column together with fresh input of urea so as to recirculate the molten urea through the column. This example was carried into effect as a 24-hour continuous operation similarly to the last example other than the above-stated provisions and operations. For the period, a total quantity of 1.5 tons of cyanuric acid was yielded whereas a total quantity of 2.4 tons of urea was supplied. The yield was substantially similar to that of the last example. Meantime, 1.5 kg. of the alloy was consumed for the period which corresponds to 0.087 percent of the yielded cyanuric acid, calculated on the 1.5 tons thereof.

Although the invention has been particularly described, it is contemplated that various changes and

What is claimed as new and desired to be secured by Letters Patent of the United States is:

1. A process of producing cyanuric acid comprising a step of subjecting a starting material selected from the group consisting of urea, biuret, and mixtures of the two to a heat treatment on the surface of at least a molten metal having a melting point not exceeding 350° C. and maintained at a temperature not exceeding 400° C.

2. A process of producing cyanuric acid comprising a step of subjecting a starting material selected from the group consisting of urea, biuret, and mixtures of the two to a heat treatment on the surface of at least a molten metal having a melting point not exceeding 350° C. and maintained at a temperature not exceeding 400° C., said metal being selected from the group consisting of tin, bismuth, lead, and alloys, said alloys including at least two components of tin and lead.

3. A process of producing cyanuric acid comprising steps of subjecting a starting material selected from the group consisting of urea, biuret, and mixtures of the two to a heat treatment on the surface of at least a molten metal having a melting point not exceeding 350° C. and maintained at a temperature not exceeding 400° C., said metal being selected from the group consisting of tin, bismuth, lead, and alloys, said alloys including at least two components of tin and lead, grinding a solid intermediate product obtained by said heat treatment so as to obtain powder having free fluidity, and subsequently heating said powder by means of a jacketed heater.

4. A process of producing cyanuric acid comprising steps of subjecting a starting material selected from the group consisting of urea, biuret, and mixtures of the two to a heat treatment on the surface of at least a molten metal having a melting point not exceeding 350° C. and maintained at a temperature not exceeding 400° C., said metal being selected from the group consisting of tin, bismuth, lead, and alloys, said alloys including at least two components of tin and lead, grinding a solid intermediate product obtained by said heat treatment so as to obtain powder having free fluidity, subsequently subjecting said powder to a secondary heat treatment by means of a jacketed heater, and meantime making water absorb urea which has been sublimated during said heat treatments and carried by gas generated by said heat treatments, so as to obtain an aqueous solution of the last-named urea for the recovery thereof.

5. A process of producing cyanuric acid comprising steps of subjecting a starting material selected from the group consisting of urea, biuret, and mixtures of the two to a heat treatment on the surface of at least a molten metal having a melting point not exceeding 350° C. and maintained at a temperature not exceeding 400° C., said metal being selected from the group consisting of tin, bismuth, lead, and alloys, said alloys including at least two components of tin and lead, grinding a solid intermediate product obtained by said heat treatment so as to obtain powder having free fluidity, subsequently subjecting said powder to a secondary heat treatment by means of a jacketed heater, and meantime washing gas generated by said heat treatment with molten urea so as to recover urea which has been sublimated during said heat treatments and carried by said gas.

6. A process of producing cyanuric acid comprising steps of subjecting a starting material selected from the group consisting of urea, biuret, and mixtures of the two to a heat treatment on the surface of at least a molten metal having a melting point not exceeding 350° C. and maintained at a temperature not exceeding 400° C., said metal being selected from the group consisting of tin, bismuth, lead, and alloys, said alloys including at least two components of tin and lead, grinding a solid intermediate product obtained by said heat treatment so as to obtain powder having free fluidity, subsequently subjecting said powder to a secondary heat treatment by means of a jacketed heater, and meantime leading gas generated by said heat treatments to a urea condensing means maintained at a temperature of 100° C. to 150° C. for recovering urea which has been sublimated during said heat treatments and carried by said gas.

7. A process of producing cyanuric acid comprising steps of subjecting a starting material selected from the group consisting of urea, biuret, and mixtures of the two to a heat treatment on the surface of at least a molten metal having a melting point not exceeding 350° C. and maintained at a temperature not exceeding 400° C., said metal being selected from the group consisting of tin, bismuth, lead, and alloys, said alloys including at least two components of tin and lead, grinding a solid intermediate product obtained by said heat treatment so as to obtain powder having free fluidity, subjecting said powder to a secondary heat treatment by means of a jacketed heater, and subsequently subjecting a product of said secondary heat treatment to a tertiary heat treatment by heating the last-named product in an aqueous solution of a mineral acid.

References Cited by the Examiner
UNITED STATES PATENTS 3,172,886  3/1965  Christoffel et al. _____ 260—248

WALTER A. MODANCE, *Primary Examiner.*

JOHN M. FORD, *Assistant Examiner.*